United States Patent

Vuillemin et al.

[11] Patent Number: 5,681,909
[45] Date of Patent: Oct. 28, 1997

[54] ANIONIC POLYMERIZATION OF ALKYL (METH)ACRYLATE MONOMERS

[75] Inventors: Bruno Vuillemin, Pau, France; Philippe Teyssie, Neuville en Condroz, Belgium; Jinshan Wang, Naperville, Ill.

[73] Assignee: Elf Atochem S.A., Puteaux, France

[21] Appl. No.: 589,371

[22] Filed: Jan. 22, 1996

[30] Foreign Application Priority Data

Jan. 20, 1995 [FR] France .................... 95 00639

[51] Int. Cl.$^6$ .................... C08F 293/00; C08F 4/48
[52] U.S. Cl. .................... 526/173; 526/209; 526/210; 526/319; 526/320
[58] Field of Search .................... 526/174, 175, 526/319, 320, 173

[56] References Cited

U.S. PATENT DOCUMENTS

| | | | |
|---|---|---|---|
| 5,147,903 | 9/1992 | Podszun | 523/115 |
| 5,298,356 | 3/1994 | Tyagi | 430/110 |
| 5,476,904 | 12/1995 | Heim | 528/299 |

FOREIGN PATENT DOCUMENTS 0524054  1/1993  European Pat. Off. .

Primary Examiner—Fred Zitomer

[57] ABSTRACT

Poly(alkyl (meth)acrylates) are inexpensively prepared, even on an industrial scale, by anionically polymerizing at least one alkyl (meth)acrylate monomer in the presence of a lithium-based initiator and in a liquid solvent medium in which the solubility parameter δ is less than 20, said initiator comprising an alcoholate having the formula ROLi, wherein R has the formula $R^1(OR^2)_m$, in which $R^1$ is a linear or branched alkyl radical having from 2 to 4 carbon atoms, $R^2$ is a linear or branched alkylene radical having from 2 to 4 carbon atoms, and m is 1, 2 or 3.

12 Claims, No Drawings

ANIONIC POLYMERIZATION OF ALKYL (METH)ACRYLATE MONOMERS

BACKGROUND OF THE INVENTION

1. Technical Field of the Invention

The present invention relates to an improved process for the anionic polymerization of alkyl (meth)acrylate monomers that is both inexpensive and can be carried out on an industrial scale.

2. Description of the Prior Art

It is known to this art to prepare poly(alkyl (meth) acrylates), and, most notably, poly(methyl (meth)acrylate) ("PMMA"), via anionic polymerization in the presence of an alkali metal alkyl or alkali metal alcoholate initiator. However, polymerization of alkyl (meth)acrylates normally proves difficult because of secondary reactions in which the anions attack, as the preferred targets, the ester groups or the hydrogen atom in the alpha position of the acrylates.

Attempts have been made to solve these problems by employing an initiator system comprising, in accordance with EP-A-185,641, an organic alkali metal compound, e.g., butyllithium, as the initiator, and an alkali metal inorganic salt, such as lithium chloride. Following this procedure, it is possible to prepare tertiary alkyl acrylate polymers, methyl methacrylate polymers, or styrene/methyl methacrylate or styrene/tertiary alkyl acrylate dual-sequenced polymers.

This process also permits improved control over the polymerization, thus yielding polymers having higher molecular weights and lower polymolecularity, but the process requires low temperatures of approximately −78° C.

Alkyl (meth)acrylate polymerization was further improved by using, in accordance with EP-A-524,054, an initiator system also comprising an initiator, for example, a butyl-alkali metal initiator, and a compound, termed a ligand, of the alkali metal alkoxy alcoholate type.

Employing these initiator systems, it is possible to control even more effectively the polymerization of the alkyl (meth) acrylates.

However, this latter prior art process still requires an initiator system containing two, and even three, constituents, since, to improve efficacy to a greater degree, a compound such as diphenylethylene is added to the butyllithium, an additive which makes the process more expensive. Furthermore, the polymerization is carried out at low temperature.

In addition, M. Tomoi et al, *Polymer Journal*, Vol. 6., No. 5, pages 438–444 (1974), describe polymerizing methyl methacrylate in the presence of an alkali metal alkoxide. However, this polymerization can be carried out only in certain solvents and, in this instance, yields poly(methyl methacrylates) containing a low percentage of syndioactic triads.

Poly(methyl methacrylates) containing a high percentage of syndiotactic triads prove advantageous, since the polymers then have higher glass transition temperatures and, therefore, greater heat-resistance.

SUMMARY OF THE INVENTION

Accordingly, a major object of the present invention is the provision of an improved process for the polymerization of alkyl (meth)acrylates that can be carried out at reduced cost, on an industrial scale, and at higher polymerization temperatures.

Another object of the present invention is the provision of an improved process for the preparation of poly(methyl methacrylates) containing a higher percentage of syndiotactic triads, for example, a percentage exceeding 70%.

Briefly, the present invention features the preparation of alkyl (meth)acrylate polymers via anionic polymerization of alkyl (meth)acrylate monomer(s) in the presence of an initiator comprising an alcoholate having the formula ROLi, in which R has the formula $R^1(OR^2)_m$, wherein $R^1$ is a linear or branched alkyl radical having from 2 to 4 carbon atoms, $R^2$ is a linear or branched alkylene radical having from 2 to 4 carbon atoms, and m is the whole number 1, 2 or 3, and said polymerization being carried out in a solvent medium in which the solubility parameter δ is less than 20.

DETAILED DESCRIPTION OF BEST MODE AND SPECIFIC/PREFERRED EMBODIMENTS OF THE INVENTION

More particularly according to the present invention, by the term "alkyl methacrylate" are intended methacrylates in which the alkyl group, optionally substituted, for example by at least one halogen atom, has from 1 to 18 carbon atoms; particularly representative thereof are the methyl, ethyl, 2,2,2-trifluoroethyl, n-propyl, isopropyl, n-butyl, sec-butyl, tert-butyl, n-amyl, i-amyl, hexyl, 2-ethylhexyl, cyclohexyl, octyl, i-octyl, and decyl methacrylates.

By the term "alkyl acryaltes" are intended primary, secondary, and tertiary alkyl acrylates, in which the alkyl group, optionally substituted, for example by at least one halogen atom, such as chlorine or fluorine, and/or at least one hydroxyl group, after protection of this hydroxyl group, has from 1 to 18 carbon atoms; particularly representative thereof are ethyl acrylate, propyl acrylate, isopropyl acrylate, butyl acrylate, isobutyl acrylate, sec-butyl acrylate, hexyl acrylate, tertiobutyl acrylate, 2-ethylhexyl acrylate, nonyl acrylate, lauryl acrylate, stearyl acrylate, cyclohexyl acrylate, and isodecyl acrylate. Phenyl acrylate, norbornyl acrylate, isobornyl acrylate, and alkylthioalkyl or alkoxyalkyl acrylates, in particular methoxy- and ethoxyethyl acrylates, are also exemplary thereof, as are acrylonitrile and the dialkylacrylamides.

The ROLi initiator is a compound described in EP-A-524,054, employed as a ligand in combination with an alkali metal-butyl initiator.

As indicated above, in the formula ROLi, R represents the group $R^1(OR^2)_m$. The radical $R^1$ is advantageously a methyl, ethyl, butyl, or benzyl radical. $R^1$ is preferably the methyl radical. $R^2$ is advantageously an ethylene, propylene, butylene, or isopropylene radical, and is preferably the ethylene radical.

The polymerization is carried out in a solvent medium in which, also as above indicated, the solubility parameter δ is less than 20. Exemplary such solvents include tetrahydrofuran, dimethoxyethane, toluene, and ethylbenzene.

The polymerization may be carried out at a temperature of at least −40° C., and even up to 60° C. It is preferably on the order of 0° C.

One important feature of this invention is that the compound employed as the initiator should be virtually pure and devoid of any residual alcohol.

To this end, the ROLi initiator may be prepared via any technique, so long as it provides an essentially pure product. For example, the procedures A and B, below, are representative:

PREPARATION OF LITHIUM METHOXYETHOXY ETHOXYLATE (METHOD A)

0.5 mole $MeOCH_2CH_2OCH_2CH_2OH$ was added to 500 ml cyclohexane. The alcoholate was prepared by reacting the alcohol with 0.5 mol BuLi in the presence of several drops of diphenylethylene (DPE). This DPE compound functioned as a color indicator (reaction of BuLi and DPE), signalling the absence of alcohol.

PREPARATION OF LITHIUM METHOXYETHOXY ETHOXYLATE (METHOD B)

0.5 mole MeOCH$_2$CH$_2$OCH$_2$CH$_2$OLi was obtained by reacting 0.5 mole MeOCH$_2$CH$_2$OCH$_2$CH$_2$OH with one mole of metallic lithium in 500 ml of THF.

The reaction time was 12 hours, followed by 6 hours under reflux. The THF was eliminated by distillation. The desired amount of cyclohexane was added to adjust the solution to the desired concentration. The conversion rate was 100%.

Polymerization, which is effected in the presence of the initiator according to the invention, preferably is carried out in the absence of moisture and oxygen.

At the end of polymerization, alkyl (meth)acrylate polymers are obtained from the active polymer by deactivating same via reaction with a proton source, in particular, an alcohol or an acid.

The polymers thus prepared, in particular, the poly (methyl methacrylates), have molecular weights ranging from 10,000 to 2,000,000. They exhibit a polymolecularity of from 1.5 to 4. These values correspond to those exhibited by conventionally produced acrylic polymers and indicate good mechanical strength. The final product poly(methyl methacrylates) contain, moreover, a percentage of syndiotactic triads of at least 70%, a percentage which imparts thereto a glass transition temperature of at least 120° C.

In order to further illustrate the present invention and the advantages thereof, the following specific examples are given, it being understood that same are intended only as illustrative and in nowise limitative.

In said examples, the following abbreviations are employed:

MMA: methyl methacrylate
LiOEM: CH$_3$OCH$_2$CH$_2$OLi
LiOE$_2$M: CH$_3$OCH$_2$CH$_2$OCH$_2$CH$_2$OLi
LiOE$_2$Bu: BuOCH$_2$CH$_2$OCH$_2$CH$_2$OLi
LiOE$_2$Bu: CH$_3$O(CH$_2$CH$_2$O)$_2$CH$_2$CH$_2$OLi

EXAMPLE 1

Methyl methacrylate (MMA) in a 10% toluene solution was added to 4×10$^{-3}$ mole lithium methoxyethoxy ethoxylate (LiOE$_2$M) prepared according to Method A. After one hour of reaction time at 0° C., the reaction was terminated by adding 5×10$^{-3}$ mole of methanol to the toluene. The polymer was recovered by precipitation in methanol, dried at 80° C. in a vacuum, weighed, then characterized via GPC and NMR. The yield was 100%.

| Mn: | 326,000 | |
|---|---|---|
| Polymolecularity (lp): | | 2.36 |
| % triads: | syndiotactic: | 77 |
| | heterotactic: | 22 |
| | isotactic: | 1 |

EXAMPLE 2

The procedure of Example 1 was repeated, but using 2×10$^{-3}$ mole of LiOE$_2$M prepared in accordance with Method A. The polymerization was carried out for 30 minutes. The polymer was obtained in a yield of 90%.

| Characteristics: | | |
|---|---|---|
| Mn: | 246,000 | |
| Polymolecularity (lp): | | 2.20 |
| % triads: | syndiotactic: | 75 |
| | heterotactic: | 24 |
| | isotactic: | 1 |

EXAMPLE 3

MMA in toluene (35% solution) was added to 3.8×10$^{-3}$ mole of LiOE$_2$M prepared in accordance with Method A. After a 10-minute reaction time at 0° C., the reaction was terminated by adding methanol to the toluene. The polymer was recovered by precipitation in methanol, dried at 80° C. in a vacuum, weighed, and characterized by GPC and NMR:

| Mn: | 104,000 | |
|---|---|---|
| Polymolecularity (lp): | | 2.03 |
| % triads: | syndiotactic: | 74 |
| | heterotactic: | 24 |
| | isotactic: | 2 |

EXAMPLE 4

The procedure of Example 3 was repeated, but using 4×10$^{-3}$ mole of LiOE$_2$Bu prepared in accordance with Method B. The polymer was obtained in a yield of 95% and had the following characteristics:

| Mn: | 78,600 | |
|---|---|---|
| Polymolecularity (lp): | | 2.79 |
| % triads: | syndiotactic: | 74 |
| | heterotactic: | 24 |
| | isotactic: | 2 |

EXAMPLE 5

MMA in toluene (10% solution) was added to 20×10$^{-3}$ mole of LiOE$_2$Bu prepared in accordance with Method B. The polymerization time was one hour. The reaction was terminated by adding methanol, and the polymer was recovered, as in Example 3, in a yield of 100%. The polymer was characterized as in Example 1.

Polymer characterization:

| Mn: | 112,000 | |
|---|---|---|
| Polymolecularity (lp): | | 3.0 |
| % triads: | syndiotactic: | 75 |
| | heterotactic: | 24 |
| | isotactic: | 1 |

EXAMPLE 6

MMA was added to 5×10$^{-3}$ mole of LiOE$_2$M prepared in accordance with Method A. Polymerization was carried out in the aggregate for one minute. The reaction was terminated by adding methanol to the toluene. The polymer was recovered by precipitation in methanol, dried at 80° C. in a vacuum, weighed, and characterized via GPC and NMR:

| | |
|---|---|
| Mn: 118,000 | |
| Polymolecularity (1p): | 3.04 |
| % triads: syndiotactic: | 75 |
| heterotactic: | 23 |
| isotactic: | 2 |

EXAMPLE 7

The procedure of Example 3 was repeated, but using $4 \times 10^{-3}$ mole of LiOEM prepared in accordance with Method B. The polymer was obtained in a yield of 94%.

Polymer characterization:

| | |
|---|---|
| Mn: 367,000 | |
| Polymolecularity (1p): | 3.4 |
| % triads: syndiotactic: | 73 |
| heterotactic: | 23 |
| isotactic: | 4 |

EXAMPLE 8

The procedure of Example 1 was repeated, but using $5 \times 10^{-3}$ mole of LiOE$_2$M, and the MMA was replaced by n-butyl methacrylate in solution in toluene (10% solution). After one hour of reaction time at 0° C., the reaction as terminated by adding $1 \times 10^{-2}$ methanol. The polymer was dried at 80° C. in a vacuum, weighed, then characterized via GPC and NMR. The yield was 100%.

| | |
|---|---|
| Mn: 222,000 | |
| Polymolecularity (1p): | 2.56 |

EXAMPLE 9

The procedure of Example 8 was repeated, but using tertbutyl acrylate in solution in toluene (10% solution). After one hour of reaction time at 0° C., polymerization was terminated by adding $10^{-2}$ mole of MeOH. The polymer was dried at 80° C. in a vacuum, weighed, then characterized via GPC and NMR. The yield was 100%.

| | |
|---|---|
| Mn: 192,000 | |
| Polymolecularity (1p): | 3.1 |

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the preparation of a poly(alkyl (meth) acrylate), which comprises anionically polymerizing at least one alkyl (meth)acrylate monomer in the presence of a one-component initiation system and in a liquid solvent medium in which the solubility parameter δ is less than 20, wherein said initiation system is an alcoholate having the formula ROLi, wherein R has the formula $R^1(OR^2)_m$, in which $R^1$ is a linear or branched alkyl radical having from 1 to 6 carbon atoms, $R^2$ is a linear or branched alkeylene radical having from 2 or 4 carbon atoms, and m is 1, 2 or 3.

2. The process as defined by claim 1, said at least one alkyl (meth)acrylate monomer comprising an alkyl methacrylate, the alkyl moiety of which having from 1 to 18 carbon atoms.

3. The process as defined by claim 2, said alkyl methacrylate comprising methyl, ethyl, 2,2,2-trifluoroethyl, n-propyl, isopropyl, n-butyl, sec-butyl, tert-butyl, n-amyl, i-amyl, hexyl, 2-ethylhexyl, cyclohexyl, octyl, i-octyl or decyl methacrylate.

4. The process as defined by claim 3, said alkyl methacrylate comprising methyl methacrylate.

5. The process as defined by claim 1, said at least one alkyl (meth)acrylate monomer comprising a primary, secondary or tertiary alkyl acrylate, the alkyl moiety of which being optionally substituted by at least one halogen atom and/or hydroxyl group and which has from 1 to 18 carbon atoms.

6. The process as defined by claim 5, said alkyl acrylate comprising ethyl, propyl, isopropyl, butyl, isobutyl, sec-butyl, hexyl, tertbutyl, 2-ethylhexyl, nonyl, lauryl, stearyl, cyclohexyl or isodecyl acrylate.

7. The process as defined by claim 1, wherein the formula $R^1(OR^2)_m$, $R^1$ is a methyl ethyl, butyl, or benzyl radical, and $R^2$ is an ethylene, propylene, butylene, or isopropylene radical.

8. The process as defined by claim 1, said liquid solvent medium comprising tetrahydrofuran, dimethoxyethane, toluene or ethylbenzene.

9. The process as defined by claim 1, carried out at a temperature ranging from −40° C. to +60° C.

10. The process as defined by claim 1, said poly(alkyl (meth)acrylate) having a percentage of syndiotactic triads of at least 70%.

11. A process for the preparation of a poly(alkyl (meth) acrylate), said process comprising anionically polymerizing an alkyl (meth)acrylate monomer in the presence of an initiation system consisting essentially of an alcoholate having the formula:

ROLi wherein R has the formula $R^1(OR^2)_m$, in which $R^1$ is a linear or branched alkyl radical having from 1 to 6 carbon atoms, $R^2$ is a linear or branched alkylene radical having from 2 to 4 carbon atoms, and m is 1, 2 or 3.

12. A process for the preparation of a poly(alkyl (meth) acrylate), said process comprising anionically polymerizing an alkyl (meth)acrylate monomer in the presence of one initiating agent, said initiating agent comprising an alcoholate having the formula ROLi, wherein R has the formula $R^1(OR^2)_m$, in which $R^1$ is a linear or branched alkyl radical having from 1 to 6 carbon atoms, $R^2$ is a linear or branched alkylene radical having from 2 to 4 carbon atoms, and m is 1, 2 or 3.

* * * * *